United States Patent
Roy et al.

[11] Patent Number: 5,942,350
[45] Date of Patent: Aug. 24, 1999

[54] GRADED METAL HARDWARE COMPONENT FOR AN ELECTROCHEMICAL CELL

[75] Inventors: Robert J. Roy, West Springfield, Mass.; Andrei Leonida, West Hartford, Conn.; Thomas J. Garosshen, Glastonbury, Conn.; Trent M. Molter, Enfield, Conn.

[73] Assignee: United Technologies Corporation, Hartford, Conn.

[21] Appl. No.: 08/814,140

[22] Filed: Mar. 10, 1997

[51] Int. Cl.⁶ ..................................................... H01M 8/02
[52] U.S. Cl. ............................. 429/38; 429/34; 429/186; 429/208; 204/409; 204/418
[58] Field of Search .................................. 429/7, 9, 208, 429/186, 34, 38; 204/409, 418

[56] References Cited

U.S. PATENT DOCUMENTS

| | | | |
|---|---|---|---|
| 3,902,977 | 9/1975 | Greenspan | 204/43 |
| 4,007,107 | 2/1977 | Johnson . | |
| 4,226,684 | 10/1980 | Scherba . | |
| 4,267,025 | 5/1981 | de Nora et al. . | |
| 4,401,541 | 8/1983 | Kobayashi | 204/206 |
| 4,414,071 | 11/1983 | Cameron et al. . | |
| 4,477,316 | 10/1984 | Saikai et al. . | |
| 4,479,864 | 10/1984 | Kanai et al. . | |
| 4,530,742 | 7/1985 | Carlin et al. . | |
| 4,584,085 | 4/1986 | Beaver et al. . | |
| 4,879,013 | 11/1989 | Austin . | |
| 4,975,161 | 12/1990 | Nidola et al. . | |
| 5,041,195 | 8/1991 | Taylor et al. . | |
| 5,158,653 | 10/1992 | Lashmore | 205/103 |
| 5,158,658 | 10/1992 | Cawlfield et al. . | |
| 5,164,062 | 11/1992 | Byrd et al. . | |
| 5,776,624 | 7/1998 | Neutzler | 429/26 |
| 5,804,327 | 9/1998 | Ottman | 429/27 |

FOREIGN PATENT DOCUMENTS

| | | | |
|---|---|---|---|
| 60-33353 | 2/1985 | Japan | C23C 28/00 |
| 2113577 | 8/1981 | United Kingdom . | |
| 2137230 | 10/1984 | United Kingdom . | |
| 2203450 | 10/1998 | United Kingdom . | |

OTHER PUBLICATIONS

Patent Abstract of Japan, vol. 005, No. 058 (c–051) dated Apr. 21, 1981.
Van Vlack, "Materials Science for Engineers" pp. 175–176 Addison–Wesley Publishing (no month available), 1970.

*Primary Examiner*—Maria Nuzzolillo
*Assistant Examiner*—Carol Chaney
*Attorney, Agent, or Firm*—Malcolm J. Chisholm, Jr.

[57] ABSTRACT

A graded metal hardware component for an electrochemical cell is shown for mechanically supporting electrochemical cell structures and defining fluid cavities and fluid passages in a cell employing a solid polymer electrolyte membrane. The graded metal hardware component includes a substrate such as stainless steel, a surface layer made of a precious metal such as gold, and a graded boundary layer adjacent to and between the substrate and surface layer, wherein the graded boundary layer is an interdiffusion of the substrate and surface layer so that the graded boundary layer is between 0.5 wt. %–5.0 wt. % of the material making up the substrate, and between 99.5 wt. %–95.0 wt. % of the material making up the surface layer, and the graded boundary layer has a thickness of between 10%–90% of a shortest distance between the substrate and an exterior surface of the surface layer. In a preferred embodiment a shortest distance between the substrate and an exterior surface of the surface layer is between 50 to 120 microinches, and the exterior surface of the surface layer has a hardness of between 150 to 200 on the Knoop scale.

13 Claims, 3 Drawing Sheets

GRADED METAL HARDWARE COMPONENT FOR AN ELECTROCHEMICAL CELL

TECHNICAL FIELD

The present invention relates to electrochemical cell stacks for electrolyzing substances, and especially relates to high pressure electrochemical cell stacks for producing oxygen and hydrogen gases from water for use in air and space craft.

BACKGROUND OF THE INVENTION

Electrochemical cells are commonly used for producing product gases from a supply fluid such as water, and may also be used in "fuel cell" configurations to produce electrical energy from supply fuels. Well known applications of the product gases include air and space craft oxygen storage, gas storage for energy conversion and space craft propulsion. A plurality of planar electrochemical cells are typically arranged in a vertical stack to satisfy specific application requirements. In such a stack the cells include common components that integrate the stack as a functional system. For example, each cell includes hardware components that define fluid cavities and fluid passages for fluid entry, processing and fluid exit from the stack; that conduct electricity; and that provide mechanical support for cell structures such as an electrolyte, seals, etc.

Electrochemical cell stacks utilized for production of oxygen and hydrogen gas from water face a variety of specific and challenging requirements. First, operational efficiencies of such electrochemical cell stacks and storage efficiencies of gases generated by the stacks increase with increased internal operating pressures. Consequently internal operating pressures often increase to levels as high as approximately 6,000 pounds per square inch (hereafter "p.s.i."). Therefore, the hardware components of individual electrochemical cells must sustain substantial pressure differentials without failure.

Second, modern electrochemical cells often use solid polymer electrolyte membranes that have highly acidic functional groups. When such a membrane is used in a cell that electrolyzes water as a supply fluid into oxygen and hydrogen gas, the aqueous solution in contact with the membrane surface becomes highly acidic. Consequently, surfaces of the cell's hardware components must be chemically stable when exposed to such an acidic aqueous solution. Third, during operation of an electrochemical cell, the electrically conductive hardware components of the cell that participate in conducting electricity are exposed to anodic and cathodic polarization. Fourth, electrolysis of water produces high pressure hydrogen gas, which deteriorates many metals by a process well-known as "hydrogen embrittlement". Accordingly, materials used to make the hardware components must exhibit a satisfactory degree of mechanical strength and chemical stability when exposed to the aforesaid pressure differential, low pH, anodic or cathodic polarization, and hydrogen embrittlement problems. For example, while most stainless steels exhibit satisfactory mechanical strength properties, unfortunately under anodic polarization and exposure to an acidic solution stainless steels dissolve at an unacceptable rate, and therefore are not satisfactory materials to make hardware components of electrochemical cells.

An additional fifth requirement of hardware components of such cells is that they have sufficiently hard surfaces to withstand fabrication and operational stresses in assembly of an individual cell; assembly of the cells into an electrochemical cell stack; and, operation of the stack. Typically, the hardware components define fluid passages passing between components and must therefore have smooth sealing surfaces to restrict improper fluid movement out of the passages at extremely high operating pressures. If a surface of a hardware component sustains a scratch or fracture during assembly, safe operation of the entire stack may be jeopardized. Assembly of such an electrochemical stack typically involves use of a plurality of nuts, bolts, washers, etc. surrounding the cells and passing between end plates to adequately pre-load seals, etc., while a variety of ducts, piping, control valves, and measuring instruments must likewise be secured to and within the stack.

Maintenance of integrity of such seals within the stack is accomplished through well-known compression components that cooperate to oppose internal operating pressures. The same compression components insure even, uninterrupted flow of electrical current through the cells and through specific hardware components of each cell. Electrical continuity and uniform current distribution through hardware components of such cell stacks is achieved through metal-to-metal contact of adjacent hardware components. The compression components maintain a compressive load over the entire area of the cell assembly of a magnitude greater than, and opposing internal operating pressures that may be up to 6,000 p.s.i., thus insuring mechanical cell integrity and proper flow of electrical current. Because of the aforesaid five specific operational and assembly requirements, most hardware components are made of specialty metals such as niobium, zirconium, titanium or alloys thereof that are chemically stable, mechanically strong, and have hard surfaces. Where electrochemical cell stacks have been employed to service limited production applications such as submarines or space craft, such specialty metal material requirements have not posed significant cost problems.

However, a recent demand for use of electrochemical cell stacks has arisen in producing oxygen gas onboard modern, commercial aircraft. For example, in the event of an emergency, such as an unexpected de-pressurization at a high altitude, oxygen masks automatically deploy to provide passengers with oxygen. The oxygen is typically stored onboard the air craft in metal bottles, and the bottles are routinely topped off while the aircraft is being serviced. An electrochemical cell stack onboard the aircraft can be used to top off the bottles thereby saving the time and cost expense of servicing on the ground, and such a cell stack can provide oxygen for other, diverse circumstances. Known electrochemical cell stacks, however, utilize hardware components made of the aforesaid specialty metals which restrict their availability to satisfy the commercial aircraft onboard oxygen generation demand primarily because of the prohibitive cost of the specialty metals.

Known bi-metals having a first metal substrate with a plated or coated second metal surface layer have surfaces too soft for application as hardware components. That is because such bi-metals have the surface layer selected and applied to resolve chemical stability, electrical conductivity, or appearance problems. A common bi-metal usage is to extend the longevity of an electrode in a cell by coating a substrate such as titanium with a surface layer such as a metal from the platinum group, thereby enhancing chemical stability of the electrode against dissolution by an electrolyte. Such bi-metals are not susceptible of practical usage as hardware components of the aforesaid high pressure electrochemical cells because of the rigorous demands of those cells for mechanical strength, chemical stability, and a hard surface. For example, a common problem with bi-metals is durability of a boundary between the surface layer and substrate. Under ordinary mechanical stress of electrochemical cell stacks necessary for adequate sealing, etc., and especially where electrical continuity and uniform current distribution depends upon uninterrupted flow through metal-to-metal contact of adjacent hardware components, interruption of the boundary between the substrate and surface layer would result in inefficient cell operation, or even cell failure due primarily to chemical instability of the substrate in such a working environment. Because known bi-metals are not designed for the rigorous requirements of hardware components of electrochemical cell stacks, they are incapable of transferring the stack's enormous compressive load from the surface layer to the substrate without unacceptable interruption of the boundary between the surface layer and substrate.

Accordingly, it is the general object of the present invention to provide a graded metal hardware component for an electrochemical cell that overcomes cost, mechanical strength and durability deficiencies of the prior art.

It is a more specific object to provide a graded metal hardware component for an electrochemical cell that is chemically stable in operating conditions of the cell.

It is another specific object to provide a graded metal hardware component for an electrochemical cell having adequate mechanical strength for support of cell structures exposed to high pressure operating conditions.

It is yet another object to provide a graded metal hardware component for an electrochemical cell that has a surface hardness adequate to resist damage during assembly of the cell and of assembly of the cell in an electrochemical cell stack and during operation of the stack.

It is a further object to provide a graded metal hardware component for an electrochemical cell that transfers an ordinary compressive load of the cell from a surface layer to a substrate without interruption of a boundary between the surface layer and substrate.

These and other advantages of this invention will become more readily apparent when the following description is read in conjunction with the accompanying drawings.

Summary of the Invention

A graded metal hardware component for an electrochemical cell is disclosed for mechanically supporting electrochemical cell structures and defining fluid cavities and passages for fluid entry, electrolytic processing and fluid exit in a high pressure electrochemical cell employing a solid polymer electrolyte membrane. In a particular embodiment, the graded metal hardware component comprises a substrate such as stainless steel, a surface layer made of a precious metal such as gold, and a graded boundary layer adjacent to and between the substrate and surface layer, the graded boundary layer comprising an interdiffusion of the substrate and surface layer wherein the graded boundary layer is between 0.5 weight per cent ("wt. %")–5.0 wt. % of the material making up the substrate, and between 99.5 wt. %–95.0 wt. % of the material making up the surface layer, and wherein the graded boundary layer has a thickness of between 10%–90% of a shortest distance between the substrate and an exterior surface of the surface layer. In a preferred embodiment a shortest distance between the substrate and an exterior surface of the surface layer is between 50 to 120 microinches, and the exterior surface of the surface layer has a hardness of between 150 to 200 on the Knoop scale.

A preferred method of manufacturing the graded metal hardware component includes the steps of first applying a coating of acid gold to the substrate, then applying a hard gold coating to the once coated substrate, and finally heat treating the twice coated substrate at between 200 degrees Celsius (hereafter "° C.") to 500° C. for between 1 to 24 hours. A preferred method for application of the coatings or deposits of the acid and hard gold is electroplating.

By first coating the substrate with the acid gold, an enhanced adhesion takes place between the substrate and the gold. By next coating the acid gold with the hard gold and then heat treating the coated substrate, the resulting surface layer demonstrates hardness appropriate for requirements of hardware components of high pressure electrochemical cells while the surface and graded boundary layers combine to shield the substrate from deleterious effects of anodic polarization of the substrate as it is exposed to an aqueous acidic solution. The hardness of the surface layer minimizes any possibility of defects in the surface layer resulting from assembly stresses such as scratches, cracks, etc., and the graded boundary layer formed through interdiffusion of acid and hard gold with the substrate substantially enhances adhesion of the surface and graded boundary layer to the substrate. The graded metal hardware component of the present invention allows utilization of a relatively inexpensive substrate such as stainless steel that offers low cost and necessary mechanical strength, while the surface and graded boundary layers combine to provide necessary chemical stability and a hard surface required of hardware components of a high pressure electrochemical cell utilizing a solid polymer electrolyte membrane.

DETAILED DESCRIPTION OF THE PREFERRED EMBODIMENT

Figure 1:
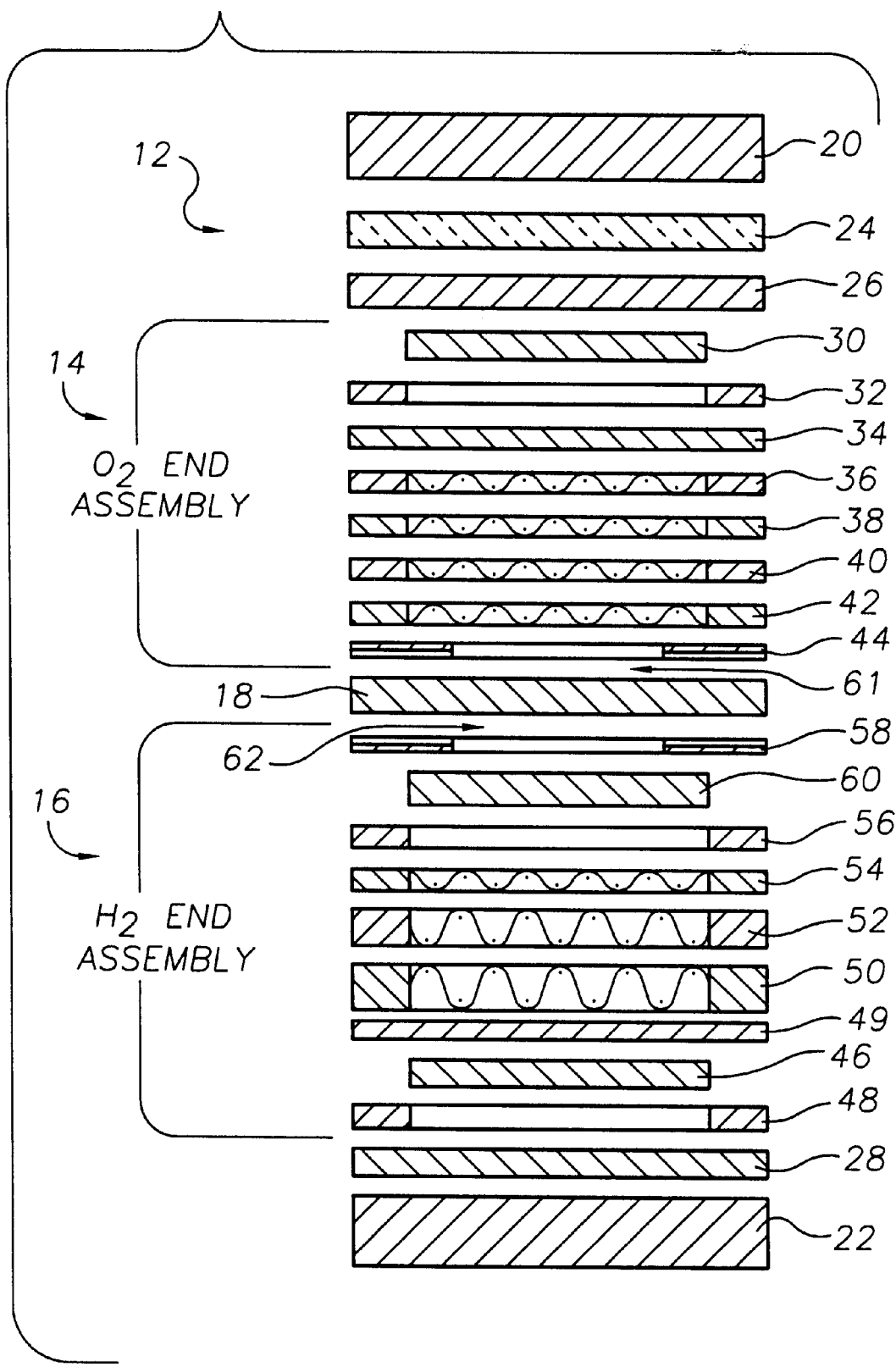
FIG. 1 is an exploded schematic view of an electrochemical cell employing graded metal hardware components constructed in accordance with the present invention.
Figure 2:
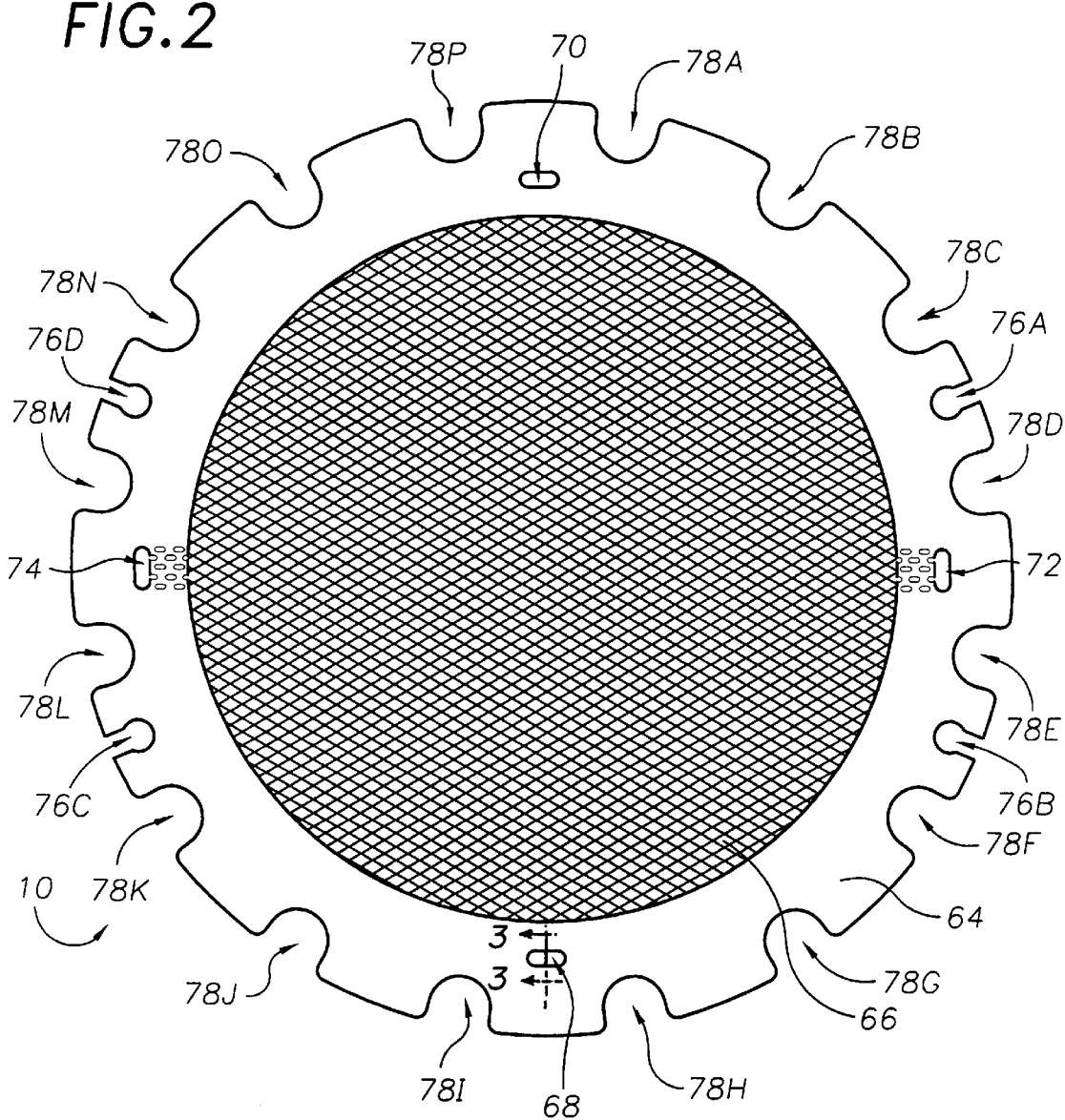
FIG. 2 is a flat plan view of a graded metal hardware component of the FIG. 1 electrochemical cell.
Figure 3:
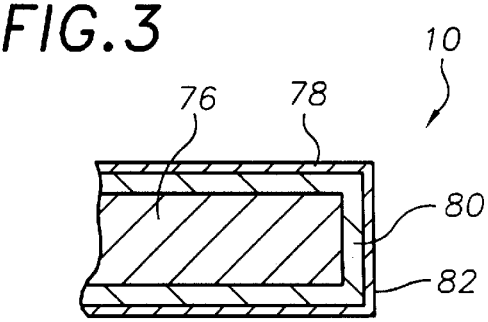
FIG. 3 is a cross-sectional, expanded, fragmentary view of a portion of the FIG. 2 graded metal hardware component taken along view lines 3—3 of FIG. 2.

Referring to the drawings in detail, a graded metal hardware component of the present invention is best shown in FIGS. 2 and 3 is generally designated by the reference numeral 10. As best seen in FIG. 1, an appropriate working environment for the graded metal hardware component is an electrochemical cell such as the electrochemical cell disclosed in U.S. Pat. No. 5,316,644 to Titterington, et al., entitled "High-Pressure Electrochemical Cell Structure", which patent is hereby incorporated herein by reference. As is well known in the art, such an electrochemical cell may be an electrolysis cell 12 (as shown schematically in FIG. 1) for electrolytically separating water into oxygen and hydrogen gas. The electrolysis cell 12 typically includes an oxygen (or "$O_2$") end assembly 14 and a hydrogen (or "$H_2$") end assembly 16 on opposed sides of a solid polymer electrolyte membrane 18, all of which are disposed in a stack between a top end plate 20 and bottom end plate 22 that cooperate with a plurality of fastening components such as bolts and nuts (not shown) to compress the cell 12 and align the cell with other cells (not shown) to form an electrochemical cell stack. As is well known in the art, each cell 12 also includes a variety of common, cooperative, functional structures, such as an insulator 24 adjacent the top end plate 20 and a positive terminal 26 between the insulator 24 and oxygen end assembly 14, while a plate cover 28 lies between the bottom end plate 22 and the hydrogen end assembly 16.

As best shown schematically in FIG. 1, the oxygen end assembly 14 of the electrolysis cell 12 includes a plurality of graded hardware components between an oxygen end pressure pad 30 and the solid polymer electrolyte membrane 18. The graded hardware components in the oxygen end 14 of the cell 12 include sequentially an oxygen porous plate frame 32, a top end separator 34, first, second and third oxygen screen frames 36, 38, 40, an oxygen membrane screen 42, and an oxygen grip protector ring 44 adjacent the solid polymer electrolyte membrane 18. Similarly, the hydrogen end assembly 16 of the cell 12 includes a plurality of graded hardware components between a hydrogen end pressure pad 46 and the solid polymer electrolyte membrane 18. The plurality of graded hardware components in the hydrogen end 16 of the cell 12 include a first hydrogen porous plate frame 48 (between the hydrogen pressure pad 46 and plate cover 28), a bottom end separator 49, and sequentially first, second and third hydrogen screen frames 50, 52, 54, a second hydrogen porous plate frame 56, and a hydrogen grip protector ring 58 adjacent the solid polymer electrolyte membrane 18. The hydrogen end assembly 16 also includes a porous plate 60 between the second hydrogen porous plate frame 56 and the hydrogen grip protector ring 58.

As seen in FIG. 1, the graded hardware components of the oxygen side 14 of the electrolysis cell 12 cooperate to define an oxygen side fluid cavity 61 between the solid polymer electrolyte membrane 18 and the top end separator 34, and the hardware components of the hydrogen side 16 of the cell 12 cooperate to define a hydrogen side fluid cavity 62 between the solid polymer electrolyte membrane 18 and the bottom end separator 49. Shown in FIG. 2 is a non-schematic presentation of a graded hardware component 10 that includes a frame 64 surrounding a screen 66. The frame 64 defines a first fluid through passage 68, a second fluid through passage 70, a first fluid entry passage 72, and a second fluid entry passage 74. As is well-known in the art and more thoroughly described in the aforesaid incorporated U.S. Pat. No. 5,316,644, when a plurality of hardware components 10 are stacked cooperatively the screens of such components would be disposed within a fluid cavity wherein the cavity would have sides defined by frames of the components so that a supply fluid such as water may pass into the cavity through the first fluid entry passage 72 and exit the cavity with entrained hydrogen gas through the second fluid entry passage 74 of the frame 64, while a product fluid such as oxygen gas is simultaneously passing through the first and/or second fluid through passages 68, 70 of the frame 64 without entering a fluid cavity defined by that frame 64. The frame 64 of the hardware component also defines a plurality of alignment notches 76A, 76B, 76C, and 76D, and a plurality of fastener notches 78A, 78B, 78C, 78D, 78E, 78F, 78G, 78H, 78I, 78J, 78K, 78L, 78M, 78N, 78O, and 78P that secure fasteners (not shown) when the graded hardware component 10 is secured within a cell such as electrolysis cell 12.

As is apparent from FIGS. 1 and 2, the graded hardware components are exposed to fluids during operation of an electrochemical cell. In operation of a high pressure cell with a solid polymer electrolyte membrane, prior art hardware components had to be capable of withstanding five operational and assembly requirements including pressure differentials of approximately 6,000 p.s.i.; low pH of the fluids contacting surfaces of the hardware components; anodic or cathodic polarization; hydrogen embrittlement; and sufficiently hard surfaces to withstand fabrication stresses during operation and assembly of the cell, which requirements are discussed in more detail above. Consequently, prior art hardware components were typically made of specialty metals such as niobium, zirconium, titanium, or alloys thereof that are chemically stable, mechanically strong, and have sufficiently hard surfaces. Components of an electrochemical cell such as the electrolysis cell 12 that are not characterized as graded hardware components would be fabricated of standard materials well known in the art.

The graded hardware component 10 of the present invention as shown in FIG. 3 is for purposes herein defined to be made of a substrate 76 such as stainless steel, a surface layer 78 made of a precious metal such as gold, and a graded boundary layer 80, wherein the graded boundary layer 80 is between 0.5 wt. % to 5.0 wt. % of the material making up the substrate, and between 99.5 wt. % to 95.0 wt. % of the material making up the surface layer, and wherein the graded boundary layer 80 is adjacent the substrate and has a thickness of between 10% to 90% of a shortest distance between the substrate 76 and an exterior surface 82 of the surface layer 78 so that the graded boundary layer contacts the substrate but does not contact the exterior surface 82 of the surface layer 78. In a preferred embodiment a shortest distance between the substrate and an exterior surface 82 of the surface layer is between 50 to 120 microinches; the graded boundary layer has a thickness of about 90% of a shortest distance between the substrate 76 and an exterior surface 82 of the surface layer 78; and the exterior surface of the surface layer has a hardness of between 150 to 200 on the Knoop scale. While gold or gold alloys are preferred metals for the surface layer, any metal or alloy that is more noble than mercury is capable of providing adequate protection to a substrate in an aqueous acidic solution provided the graded hardware component includes a graded boundary layer of the aforesaid concentrations and dimensions. Additionally, the substrate 76 may be a stainless steel such as well-known 300 series stainless steels, or the substrate 76 may be any standard engineering material that meets well-known strength and chemical compatibility requirements of known electrochemical cells.

A preferred method of manufacturing the graded hardware component 10 includes the steps of first coating or applying an acid gold strike to the substrate 76; next applying a coating of hard gold to the once coated substrate; and then heating the twice coated substrate to between 200° C. to 500° C. for between 1 to 24 hours. An even more preferred method of manufacturing the graded metal hardware component includes the aforesaid first and second applying steps and then heating the twice coated substrate at between 250° C. to 350° C. for between 3 to 5 hours. The heating step has been found to enhance a metallurgical bond and heal any defects between the substrate, graded boundary layer and surface layer. A preferred method for application of the coatings or deposits of acid and hard gold is electroplating. If a precious metal other than gold is used for the surface layer, then the aforesaid method of manufacture of the graded hardware component 10 includes first application of an acid metal strike to the substrate followed by application of a hard metal to form the surface layer. A most preferred embodiment of the graded metal hardware component includes use of a 316L stainless steel wherein a shortest distance from the substrate to the exterior surface of the surface layer is approximately 75 microinches.

For purposes of the present invention, application of an "acid gold strike" or "acid metal strike" means application of the gold or metal by a deposit from an acid solution such as known acid chlorides commonly used in electroplating. Similarly, for the present invention, "hard gold" or "hard metal" means the gold or metal includes a concentration of between 0.1 wt. %–0.3 wt. % of a transition metal, such as nickel, cobalt, or iron. A preferred method of application of the hard gold or hard metal is for the hard gold or hard metal to be deposited onto the once coated substrate from a solution having a pH of approximately 4.5 and having a temperature of between 100 degrees fahrenheit (hereafter "° F.") to 150° F. until the resulting surface and graded boundary layers reach a depth of between 50–120 microinches, meaning in other words a shortest distance from the substrate to an exterior surface of the surface layer is between 50–120 microinches.

Figure 4:
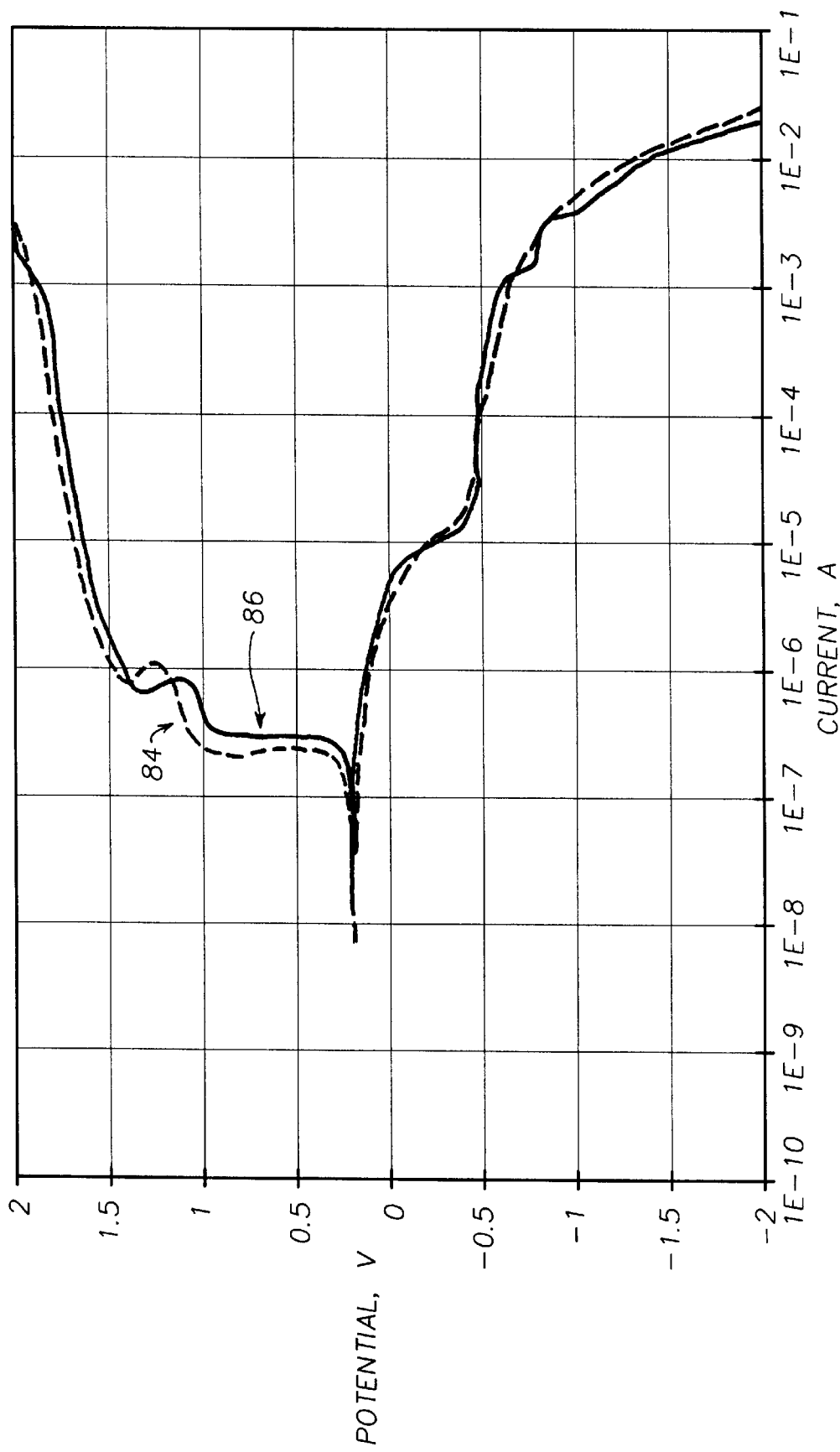
FIG. 4 is a graph showing polarization behavior of a graded metal hardware component constructed in accordance with the present invention compared to a reference hardware component.

In operation of an electrochemical cell, conductive hardware components exposed to an electrical potential across an electrolyte experience anodic and cathodic polarization as discussed above. Because such polarization may result in damage to hardware components simultaneously exposed to aqueous acidic solutions, prior art electrochemical cells utilizing solid polymer electrolyte membranes therefore utilized hardware components made of specialty metals such as niobium, zirconium, titanium, etc., to minimize deleterious effects of such polarization. To determine response to such stressful conditions of a graded metal hardware component constructed in accordance with the present invention, an experiment was performed that measured electrochemical resistance to anodic and cathodic polarization of the substrate of the graded metal hardware component by comparing polarization behavior of the graded component to polarization behavior of a reference component made of solid gold. In the experiment, the graded metal hardware component having a 316L stainless steel substrate completely encased by a surface layer primarily of gold and the reference component of solid gold were immersed in a 0.1N solution of $H_2SO_4$ and an electrical potential in a range relevant to water electrolysis of $-2$ Volts ("V") to $+2$ V direct current was applied to the graded component and reference component. FIG. 4 is a graph that plots the behavior of the graded metal hardware component in a broken plot line 84 and also plots the behavior of a solid gold reference hardware component in a solid plot line 86 through the aforesaid $-2$ V to $+2$ V range. As is apparent from FIG. 4, a corrosion current plotted along the X axis of the graph (being between $1\times10^{-10}$ amps ("A") (represented in FIG. 4 as "1E-10") to $1\times10^{-1}$A (represented in FIG. 4 as "1E-1")) for the graded metal hardware component and reference component show essentially identical current responses throughout the voltage range. The corrosion current in the experiment is a direct measure of a rate of corrosion for the two components and hence the experiment shows that a rate of corrosion for the graded metal hardware component is approximately the same as for pure gold so that it is appropriate for usage in an electrochemical cell involving exposure to acidic aqueous solutions. Likewise, it can be concluded that the surface layer of a graded metal hardware component constructed in accordance with the present invention is as noble as pure gold when exposed to operating conditions of an electrochemical cell. Therefore, the stainless steel substrate will not experience the deleterious effect of dissolving at an unacceptable rate when the surface layer encasing the substrate is exposed to an aqueous acidic solution and anodic polarization within an operating electrochemical cell utilizing a solid polymer electrolyte membrane.

While the present invention has been described and illustrated with respect to a particular construction, it will be understood by those skilled in the art that the present invention is not limited to this particular example. For example, the graded metal hardware component 10 has been described within an electrolysis cell 12, but could also be utilized within a fuel cell configuration of an electrochemical cell. Accordingly, reference should be made primarily to the attached claims rather than the foregoing specification to determine the scope of the invention.

What is claimed is:

1. A graded metal hardware component for mechanically supporting electrochemical cell structures and for defining fluid cavities and fluid passages within the cell, comprising:

a. a substrate;

b. a surface layer having an exterior surface exposed to fluids passing through and undergoing electrolytic processing in the fluid cavities and passages within the electrochemical cell; and, c. a graded boundary layer adjacent to, between and in contact with the substrate and surface layer, the graded boundary layer being an interdiffusion of the substrate and surface layer wherein the graded boundary layer is between 0.5 wt. % to 5.0 wt. % of the material making up the substrate and between 99.5 wt. % to 95.0 wt. % of the material making up the surface layer and the graded boundary layer has a thickness of between 10% to 90% of a shortest distance between the substrate and the exterior surface of the surface layer so that the graded boundary layer contacts the substrate but does not contact the exterior surface of the surface layer and the material making up the substrate does not contact the fluids passing through the fluid cavities and passages within the electrochemical cell.

2. The graded metal hardware component of claim 1, wherein the graded boundary layer has a thickness of about 90% of a shortest distance between the substrate and the exterior surface of the surface layer.

3. The graded metal hardware component of claim 1, wherein the surface layer comprises a metal that is more noble than mercury.

4. The graded metal hardware component of claim 1, wherein the substrate is a stainless steel.

5. The graded metal hardware component of claim 1, wherein the surface layer comprises gold.

6. The graded metal hardware component of claim 1, wherein the shortest distance between the substrate and the exterior surface of the surface layer is between 50 to 120 microinches.

7. The graded metal hardware component of claim 1, wherein the surface layer has a hardness of between 150 to 200 on the Knoop scale.

8. A graded metal hardware component for mechanically supporting electrochemical cell structures and for defining fluid cavities and fluid passages within the cell, comprising:

a. a substrate;

b. a surface layer being a metal more noble than mercury having an exterior surface exposed to fluids passing through and undergoing electrolytic processing in the fluid cavities and passages within the electrochemical cell; and, c. a graded boundary layer adjacent to, between and in contact with the substrate and surface layer, the graded boundary layer being an interdiffusion of the substrate and surface layer wherein the graded boundary layer is between 0.5 wt. % to 5.0 wt. % of the material making up the substrate and between 99.5 wt. % to 95.0 wt. % of the material making up the surface layer and the graded boundary layer has a thickness of between 10% to 90% of a shortest distance between the substrate and the exterior surface of the surface layer so that the graded boundary layer contacts the substrate but does not contact the exterior surface of the surface layer and the material making up the substrate does not contact the fluids passing through the fluid cavities and passages within the electrochemical cell.

9. The graded metal hardware component of claim 8, wherein the graded boundary layer has a thickness of about 90% of a shortest distance between the substrate and the exterior surface of the surface layer.

10. The graded metal hardware component of claim 9, wherein the surface layer comprises gold.

11. The graded metal hardware component of claim 10, wherein the substrate is a stainless steel.

12. The graded metal hardware component of claim 11, wherein the shortest distance between the substrate and the exterior surface of the surface layer is between 50 to 120 microinches.

13. The graded metal hardware component of claim 11, wherein the shortest distance between the substrate and the exterior surface of the surface layer is about 75 microinches.

* * * * *